United States Patent
Suzuki et al.

(10) Patent No.: US 7,338,582 B2
(45) Date of Patent: *Mar. 4, 2008

(54) METHOD FOR MANUFACTURING MANGANESE OXIDE NANOSTRUCTURE AND OXYGEN REDUCTION ELECTRODE USING SAID MANGANESE OXIDE NANOSTRUCTURE

(75) Inventors: Nobuyasu Suzuki, Nara (JP); Yasunori Morinaga, Suita (JP); Hidehiro Sasaki, Neyagawa (JP); Yuka Yamada, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 182 days.

This patent is subject to a terminal disclaimer.

(21) Appl. No.: 11/203,994

(22) Filed: Aug. 16, 2005

(65) Prior Publication Data

US 2006/0018821 A1    Jan. 26, 2006

Related U.S. Application Data

(63) Continuation of application No. PCT/JP04/012699, filed on Aug. 26, 2004.

(30) Foreign Application Priority Data

Aug. 26, 2003  (JP) .............................. 2003-300891

(51) Int. Cl.
*C23C 14/08* (2006.01)

(52) U.S. Cl. ........................... 204/298.13; 204/298.12; 204/192.12; 204/192.22; 427/70; 427/126.3; 427/255.19; 427/255.31; 427/419.2; 427/576; 427/584; 427/597; 252/500; 252/518.1; 423/599; 423/605; 117/88; 117/92; 117/103; 117/108

(58) Field of Classification Search ................ 204/291, 204/298.13, 192.12, 192.22; 252/500, 518.1; 423/599, 594.15, 605; 429/224, 231.95; 427/70, 126.3, 255.19, 255.31, 419.2, 576, 427/584, 597; 117/88, 92, 103, 108
See application file for complete search history.

(56) References Cited

U.S. PATENT DOCUMENTS 6,630,257 B2 * 10/2003  Ye et al. ..................... 428/698

(Continued)

FOREIGN PATENT DOCUMENTS

CN        1286733 C    11/2006

(Continued)

OTHER PUBLICATIONS

Sasaki et al., "Preparation of Metal Oxide Nanoparticles by Laser Ablation", Laser Review, 2000, vol. 28, No. 6, pp. 348-353.

(Continued)

*Primary Examiner*—Bruce F. Bell
(74) *Attorney, Agent, or Firm*—McDermott Will & Emery LLP

(57) ABSTRACT

It is an object of the present invention to provide an oxygen reduction electrode having excellent oxygen reduction catalysis ability. In a method of manufacturing a manganese oxide nanostructure having excellent oxygen reduction catalysis ability and composed of secondary particles which are aggregations of primary particles of manganese oxide, a target plate made of manganese oxide is irradiated with laser light to desorb the component substance of the target plate, and the desorbed substance is deposited on a substrate facing substantially parallel to the aforementioned target plate.

21 Claims, 9 Drawing Sheets

U.S. PATENT DOCUMENTS

| | | | |
|---|---|---|---|
| 6,960,335 B1 * | 11/2005 | Singhal et al. | 423/599 |
| 2006/0001012 A1 * | 1/2006 | Suzuki et al. | 252/500 |
| 2006/0174903 A9 * | 8/2006 | Saoud et al. | 131/364 |

FOREIGN PATENT DOCUMENTS

| | | |
|---|---|---|
| JP | 10-302808 | 11/1998 |
| JP | 2000-505040 | 4/2000 |
| JP | 2003-201121 | 7/2003 |

OTHER PUBLICATIONS

Chinese Office Action issued in corresponding Chinese Patent Application No. CN 2004800158448, dated Dec. 8, 2006.

Sasaki et al., Shadan Hojin Laser Kenkyu, 2000, vol. 28, No. 6., pp. 348-353.

* cited by examiner (a) Test electrode cross-section (b) Expanded view of glassy carbon part (a) Test electrode cross-section (b) Expanded view of gold rod part 1 Working electrode
2 Counter electrode
3 Reference electrode
4 Stirrer

METHOD FOR MANUFACTURING MANGANESE OXIDE NANOSTRUCTURE AND OXYGEN REDUCTION ELECTRODE USING SAID MANGANESE OXIDE NANOSTRUCTURE

REFERENCE TO RELATED APPLICATION

This Application is a continuation of International Application No. PCT/JP2004/012699, whose international filing date is Aug. 26, 2004, which in turn claims the benefit of Japanese Application No. 2003-300891, filed Aug. 26, 2003, the disclosures of which Applications are incorporated by reference herein. The benefit of the filing and priority dates of the International and Japanese Applications is respectfully requested.

TECHNICAL FIELD

The present invention relates to a method for manufacturing a manganese oxide nanostructure having oxygen reduction catalysis ability. Moreover, the present invention relates to an oxygen reduction electrode using a manganese oxide nanostructure.

BACKGROUND ART

To date, microstructured materials have been obtained by rapidly solidifying composite of metal(s), alloy(s), compound(s), etc., and most of the obtained microstructured materials have particle sizes of several microns. In recent years, research has been actively conducted seeking to minimize the size of materials, i.e., from the micron to nanometer order. One of the primary characteristics of nanostructures such as nanoparticles is that a high percentage of atoms exists on the particle boundary (surface). For example, the ratio may reach 40% in 5 nm nanoparticles. Nanostructured materials may have chemical and physical characteristics that differ greatly from those of microstructured materials having the same chemical composition, and nanostructured materials often exhibit desirable characteristics.

However, it is currently difficult to obtain, for example, manganese oxides ($MnO_x$) in a nanostructured form. Usually, the particle size of transition metal oxides prepared for commercial use is in the level of microns. The characteristics of micron-scale manganese oxides when used as an oxygen reduction catalyst have been reported. For example, No. 2000-505040 of National Publication of PCT application discloses that manganese oxide materials of different oxidation states (valencies) exhibit different catalytic activities, $Mn_2O_3$ and MnOOH which are trivalent manganese compounds have higher oxygen reduction catalytic activity than $Mn_3O_4$ and $Mn_5O_8$ which have different valencies, and the oxygen reduction potential of $Mn_2O_3$ and MnOOH is observed around −0.3 V and −1.0 V, respectively.

As a method for manufacturing nanostructured manganese dioxide ($MnO_2$), for example, a method is known wherein an aqueous potassium permanganate ($KMnO_4$) solution is sprayed onto an aqueous sulphuric acid solution comprising manganese sulfate ($MnSO_4$) dissolved therein to produce a synthetic reaction, a reaction product is separated out, and the reaction product is subjected to heat treatment to obtain manganese dioxide ($MnO_2$) (the aforementioned National Publication, page 42, FIG. 2).

An example of an oxygen reduction electrode using a manganese oxide is an air-zinc battery, wherein a mixture of micron-scale trimanganese tetraoxide ($Mn_3O_4$) and manganese dioxide ($MnO_2$) powder is used as the oxygen reduction electrode (Japanese Unexamined Patent Publication No. H10-302808, page 8, FIG. 2).

Other publications which can be mentioned in connection with the present invention are Sasaki, Takeshi, "Preparation of metal oxide nanoparticles by laser ablation," *Laser Research Foundation* Vol. 28 No. 6, June, 2000 and *Journal of the Electrochemical Society*, 149 (4), A504-A507 (2002).

DISCLOSURE OF THE INVENTION

Nanostructured materials which have a large surface area are particularly useful for applications in which a chemical reaction mediated by an active center plays a significant role, i.e., catalytic applications. The larger the contact area such materials have with the ambient environment (gases, liquids, etc.), the better the catalytic reaction. Therefore, there is a clear advantage in forming catalytic materials so as to have a nanostructure.

Furthermore, when a transition metal oxide is used as a catalytic material for an oxygen reduction electrode, the lower the oxygen reduction electrode potential, the better. In terms of cost, the less support required, the better.

The present invention has been accomplished in light of the above points. A primary object of the present invention is to provide an oxygen reduction electrode having excellent oxygen reduction properties (oxygen reduction catalytic ability).

The inventors conducted extensive research and found that the above object can be achieved by using materials having a specific microstructure as oxygen reduction electrodes. The present invention has been accomplished by the above findings.

That is, the present invention relates to the following method for manufacturing a manganese oxide nanostructure, and to an oxygen reduction electrode employing the manganese oxide nanostructure.

1. A method for manufacturing a nanostructured manganese oxide which has oxygen reduction catalysis ability and is formed from secondary particles that is an agglomeration of primary particles, wherein the method comprises the steps of;

removing components from a target plate that comprises one or more kinds of manganese oxides by irradiating the target plate with laser light, and depositing the removed components on a substrate that is opposed to the target plate substantially in parallel to obtain the nanostructured manganese oxide.

2. The method of above 1, wherein the oxygen reduction potential of the nanostructured manganese oxide is in the vicinity of −0.1 V in a cyclic voltammogram employing a cyclic voltammetry, the cyclic voltammetry using a three-electrode cell in which the nanostructured manganese oxide is used as the working electrode, platinum is used as the counter electrode, silver/silver chloride is used as the reference electrode, and an aqueous 0.1 mol/l potassium hydroxide solution at pH 13 is used as the electrolyte.

3. The manufacturing method according to above 1, wherein the steps are carried out in an atmosphere comprising inert gas.

4. The manufacturing method according to above 1, wherein the steps are carried out in an atmosphere comprising a mixed gas of inert gas and reactive gas.

5. The manufacturing method according to above 4, wherein the content of the reactive gas is no less than 0.1% and no more than 50% in terms of the mass flow ratio.

6. The manufacturing method according to above 4, wherein the reactive gas is an oxidizing gas.

7. The manufacturing method according to above 6, wherein the oxidizing gas is a gas containing oxygen gas.

8. The manufacturing method according to above 3, wherein energy is provided to activate the atmosphere.

9. The manufacturing method according to above 4, wherein energy is provided to activate the atmosphere.

10. The manufacturing method according to above 3, wherein the pressure of the gas is in the range of no less than 13.33 Pa and no more than 1333 Pa.

11. The manufacturing method according to above 4, wherein the pressure of the gas is in the range of no less than 13.33 Pa and no more than 1333 Pa.

12. The manufacturing method according to above 1, wherein the laser light is pulse laser light with a pulse duration of no less than 5 ns and no more than 20 ns.

13. The manufacturing method according to above 1, wherein the laser light is from an excimer laser having halogen gas and noble gas as the laser medium.

14. The manufacturing method according to above 1, wherein the energy density of the laser light is no less than 0.5 J/cm$^2$ and no more than 2 J/cm$^2$.

15. The manufacturing method according to above 1, wherein the target plate absorbs light having the wavelength range of the laser light.

16. The manufacturing method according to above 1, wherein the target plate is a sintered body of manganese oxide.

17. The manufacturing method according to above 1, further comprising a step of heating the obtained nanostructured manganese oxide.

18. The manufacturing method according to above 3, wherein the pressure of the atmosphere is altered.

19. The manufacturing method according to above 4, wherein the pressure of the atmosphere is altered.

20. The manufacturing method according to above 1, further comprising a step of installing the target plate and the substrate in the reaction system so as to be facing and parallel to each other in advance before the steps.

21. The manufacturing method according to above 1, further comprising a step of adjusting at least one of 1) the pressure of the atmosphere and 2) the distance between the target plate and the substrate, in order to control the size of the high-temperature and the high-pressure region that is formed in the vicinity of the target plate by irradiating the target plate with the laser light.

22. An oxygen reduction electrode comprising a nanostructured manganese oxide formed from secondary particles that is an aggregation of primary particles, wherein oxygen reduction potential near –0.1 V is exhibited in a cyclic voltammogram obtained by cyclic voltammetry using a three-electrode cell having the nanostructured manganese oxide as the working electrode, platinum as the counter electrode, silver/silver chloride as the reference electrode and an aqueous 0.1 mol/l potassium hydroxide solution at pH 13 as the electrolyte.

23. The oxygen reduction electrode according to above 22, wherein the mean particle size of the primary particles is no less than 1 nm and no more than 50 nm.

24. The oxygen reduction electrode according to above 22, wherein the mean particle size of the secondary particles is no less than 100 nm and no more than 1 μm.

25. The oxygen reduction electrode according to above 22, wherein the mean particle size of the primary particles is no less than 1 nm and no more than 50 nm and wherein the mean particle size of the secondary particles is no less than 100 nm and no more than 1 μm.

26. The oxygen reduction electrode according to above 22, wherein the manganese oxide is at least one of manganese monoxide, trimanganese tetroxide, dimanganese trioxide and manganese dioxide.

27. The oxygen reduction electrode according to above 22, wherein oxygen reduction potential is exhibited in the range of no less than –0.2 V and no more than 0 V in a cyclic voltammogram.

28. The oxygen reduction electrode according to above 22, wherein the nanostructured manganese oxide is a layer structure having a thickness of 500 nm or less.

29. The oxygen reduction electrode according to above 22, wherein the nanostructured manganese oxide is formed on a conductive substrate.

30. The oxygen reduction electrode according to above 22, wherein the manganese oxide nanostructure is obtained by a manufacturing method comprising the steps of;
removing components from a target plate that comprises one or more kinds of manganese oxides by irradiating the target plate with laser light, and
depositing the removed components on a substrate that is opposed to the target plate substantially in parallel to obtain the nanostructured manganese oxide.

LIST OF ELEMENTS

Figure 1:
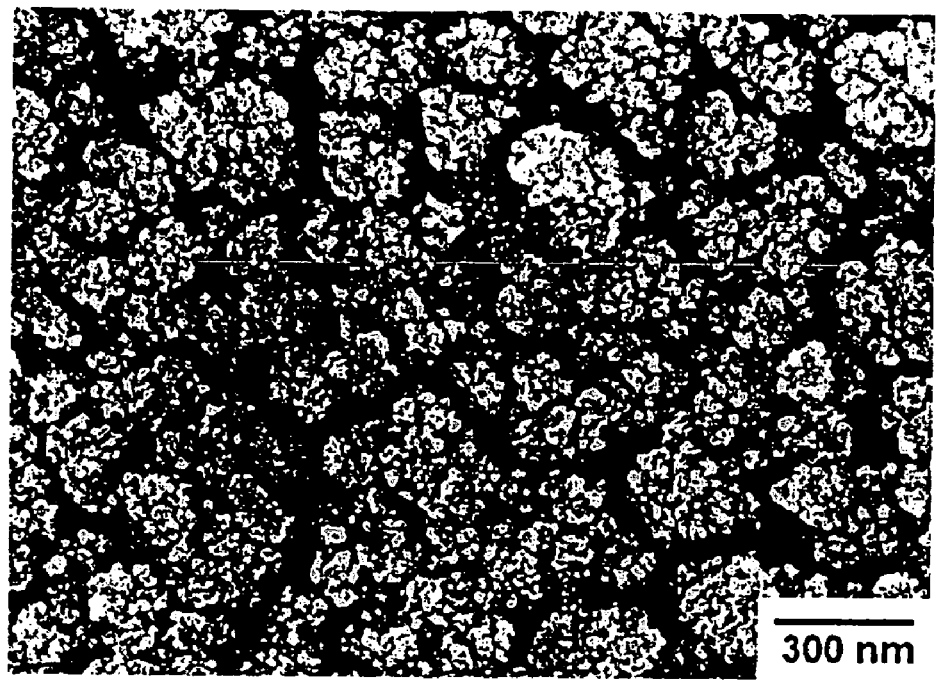
FIG. 1 shows a scanning electron microscope photograph of a manganese oxide nanostructure according to Embodiment 1 of the present invention having a structure composed of secondary particles which are aggregations of primary particles.

201 Primary particles
202 Secondary particles
301 Reaction chamber
302 Ultra-high vacuum exhaust system
303 Mass flow controller
304 Gas feed line
305 Gas exhaust system
306 Target holder 307 Target
308 Pulse laser light source
309 Substrate
310 Laser introduction window
311 Slit
312 Lens
313 Reflector
314 Plume
501 Glassy carbon
502 Copper rod
503 Manganese oxide nanostructure
701 Gold rod

BEST MODE FOR CARRYING OUT THE INVENTION

1. Method for Manufacturing Manganese Oxide Nanostructure

The manufacturing method of the present invention is a method for manufacturing a nanostructured manganese oxide which has oxygen reduction catalysis ability and is formed from secondary particles that is an agglomeration of primary particles, wherein the method comprises the steps of;

removing components from a target plate that comprises one or more kinds of manganese oxides by irradiating the target plate with laser light, and depositing the removed components on a substrate that is opposed to the target plate substantially in parallel to obtain the nanostructured manganese oxide.

There is no limitation on the manganese oxide, which is a starting material for obtaining a nanostructure, as long as it can be used as a target material for subjection to irradiation with laser light, and various kinds of manganese oxides can be used. For example, at least one member selected from the group consisting of manganese monoxide (MnO), trimanganese tetroxide ($Mn_3O_4$), dimanganese trioxide ($Mn_2O_3$) and manganese dioxide ($MnO_2$) can be suitably used. In this case, it is desirable to select the same oxide as the desired manganese oxide nanostructure. For example, when a nanostructure of trimanganese tetroxide is to be obtained, it is desirable to use a target plate composed of a trimanganese tetroxide sintered body.

The manganese oxide may be crystalline or amorphous. Moreover, if the manganese oxide is crystalline, either a polycrystal or a single crystal can be used. Therefore, for example, a manganese oxide sintered body etc., can be suitably used.

The shape of a manganese oxide target plate is not limited as long as it is suitable for receiving irradiation of a laser light. For example, a manganese oxide with a thickness of from about 0.5 mm to about 10 mm can be suitably used as a target plate. The target plate may be such that a manganese oxide is deposited on a suitable support. The dimensions of the target plate may be suitably selected depending on the conditions for laser ablation, etc.

There is no particular limitation on the material for a substrate and it is possible to use substrates formed from various materials such as Si, $SiO_2$, etc.

In the present invention, components of the target plate are desorbed by irradiating the target plate with laser light, and then the desorbed components are deposited on a substrate that is opposed to the target plate roughly in parallel. In other words, in the present invention, a laser ablation method (preferably, a pulsed laser ablation method) is used. The laser ablation method can be performed using a known reactor, etc.

The laser ablation method is such that the surface of a target is melted and desorbed by irradiating the target with laser light having a high energy density (particularly, 0.5 $J/cm^2$ or more, and preferably in the range of from 0.5 $J/cm^2$ to 2 $J/cm^2$). A pulsed laser ablation method is such that pulsed laser light is used as the laser light.

One of the main features of the laser ablation method is that it has non-thermal equilibrium properties and is conducted as a non-mass process. A specific example of the effects of these non-thermal equilibrium properties is that spatial and time selective excitation is possible. In particular, the laser ablation method is advantageous because of its spatial selective excitation properties. In known thermal processes or plasma processes, a great large area of the reaction vessel or the entire reaction vessel, is exposed to heat, ions, etc. In contrast, according to the laser ablation method, it is possible to excite only the necessary source of material, and therefore it is a clean process by which contamination with impurities is reduced.

Moreover, a non-mass process indicates that the process causes remarkably less damage compared to the ion process which is also has non-thermal equilibrium properties. The materials desorbed by laser ablation are mainly ions and neutral particles such as atoms, molecules, and clusters (consisting of a few to tens of atoms). The kinetic energy thereof reaches tens of eV in case of ions, and several eV in case of neutral particles. This is far higher than that of atoms evaporated by heating but far lower than an ion beam.

The laser ablation process which is clean and causes little damage is suitable for producing a nanostructure. When the laser ablation process is employed, it is possible to control the contamination with impurities, composition, crystallinity, etc., of the obtained nanostructure. In order to produce a nanostructure by employing the laser ablation method, it is desirable that the target material absorbs a light having the same wavelength band as that of the laser light that is emitted from the light source.

In the production method of the present invention, when a pulsed laser light is used as a laser light, it is preferable that the pulse duration be at least 5 ns but no more than 20 ns. Furthermore, it is usually preferable that the wavelength be at least 150 nm but no more than 700 nm. It is usually preferable that the pulse energy be at least 10 mJ but no more than 500 mJ. It is also usually preferable that the repetition frequency be at least 5 Hz but no more and than 1 KHz.

The laser medium (type of laser) for producing laser light is not limited, and can be, for example, a gas laser such as an excimer laser, or a solid laser such as a YAG laser. It is especially desirable to use an excimer laser (in particular, an excimer laser in which a halogen gas and a noble gas are used as the laser medium). For example, an ArF excimer laser which uses fluorine gas and argon as a laser medium can be suitably used.

Figure 3:
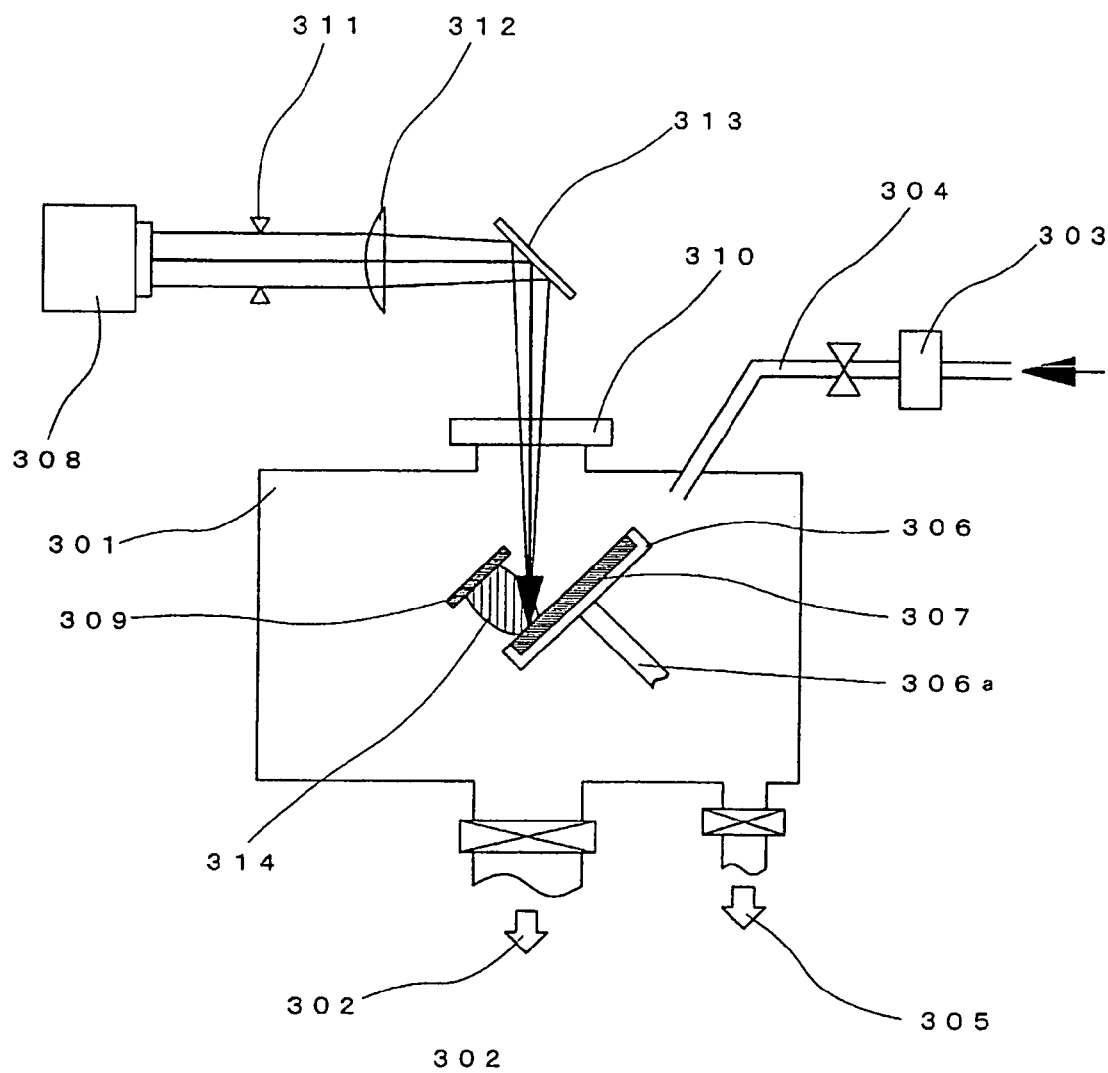
FIG. 3 is a block diagram showing a nanostructure preparation device which is used in a method for preparing a manganese oxide nanostructure according to an embodiment of the present invention.

In the present invention, the material desorbed from the target plate is deposited on a substrate that is disposed substantially parallel with the target plate (FIG. 3). In other words, the desorbed material is deposited on the substrate under conditions where the target plate and the substrate are disposed substantially in parallel. This method employs a so-called on-axis condition and differs from methods that employ a so-called off-axis condition (i.e., method wherein the desorbed material is deposited on substrates under conditions where the target plate and the substrate are disposed substantially perpendicular to each other). By depositing the material in an on-axis condition, in the present invention, the finally obtained nanostructured manganese oxide exhibits better oxygen reduction properties compared to that employing an off-axis condition.

Therefore, when the laser ablation method under an on-axis condition is performed, using a known reactor, etc., it is desirable that the target plate and the substrate be set-up in the reaction system in such a manner that they are opposed to each other in parallel beforehand.

When a reactor is used, at least one of 1) the pressure of the atmosphere, and 2) the distance between the target plate and the substrate may be controlled, in order to control the size of the high temperature and high pressure region that is formed in the vicinity of the target plate by irradiating the target plate with the beam light. This makes it possible to effectively form a nanostructured manganese oxide on a substrate.

In the manufacturing method of the present invention a suitable atmospheric gas can be used. When atmospheric gas is used, the type of atmospheric gas can be selected appropriately according to the type of target manganese oxide nanostructure (desired oxidation number and the like). Inert gas can normally be used. For example, Ar, He, $N_2$ or the like can be used as the inert gas.

A mixed gas of inert gas and reactive gas can also be used as necessary. This method allows greater coordination with other processes than when inert gas is used alone. That is, the effect of reactive gasses remaining in the chamber or the like can be discounted. An oxidizing gas or the like for example can be used as the reactive gas. When a reactive gas is used, the content of reactive gas can be determined appropriately depending on the type of reactive gas, the desired characteristics and the like, but normally the content of reactive gas can be set in the range of no less than 0.1% but no more than 50% in terms of the mass flw ratio.

In particular, an oxidizing gas can be used favorably as the reactive gas. Specific examples of oxidizing gasses including various gasses such as $O_2$ (oxygen), $O_3$, $NO_2$ and the like. In particular a gas containing oxygen can be used favorably as the oxidizing gas.

The pressure of the atmosphere can be suitably selected depending on the composition of the atmosphere. In order to produce a nanostructured manganese oxide having the same composition as that of the target material, it is preferable that the pressure of the atmosphere be in the range of from 13.33 Pa to 1333 Pa.

In the present invention, it is possible to vary the pressure of the atmosphere, if necessary. This makes it possible to control the structur of the nanostructure in the deposition direction, and the properties of the nanostructured manganese oxide.

It is also possible to activate the atmosphere by energizing the ambient atmosphere, whereby the valency of the manganese can be increased. Specific examples of methods for energizing the ambient atmosphere include ultraviolet radiation irradiation, electron beam irradiation, etc.

In this way, by depositing substance desorbed from a target plate onto a substrate, it is possible to finally form a nanostructured manganese oxide on the substrate. In general, a substance (atoms, molecules, ions, clusters and the like) desorbed from a target plate by laser ablation accumulates or grows as it is deposited on the substrate, so that finally the nanostructured manganese oxide which is formed on the substrate consists of secondary particles which are aggregations of primary particles.

In the present invention, the aforementioned manganese oxide nanostructure can be further heated as necessary. In particular, the oxidation number of the manganese oxide can be increased by heating in an oxidizing gas atmosphere. For example, when the resulting manganese oxide nanostructure is trimanganese tetraoxide ($Mn_3O_4$), dimanganese trioxide ($Mn_2O_3$) can be obtained by heating in an oxidizing atmosphere. The heating temperature is not particularly limited but can normally be 600° C. or more. The upper limit can be set appropriately.

In general, the manganese oxide nanostructure obtained by the manufacturing method of the present invention consists of secondary particles which are aggregations of primary particles. In this way a large number of catalytic activity points can be provided by the minute primary particles while effective dispersion of the reactant is promoted by the size of the secondary particles.

The mean particle size of the primary particles is not limited but should normally be in the range of no less than 1 nm and no more than 50 nm. The mean particle size of the secondary particles is also not particularly limited but should normally be in the range of no less than 100 nm and no more than 1 μm.

In addition, the manganese oxide which makes up the manganese oxide nanostructure can be selected appropriately according to the desired use and the like. In particular, at least one of manganese monoxide, trimanganese tetroxide, dimanganese trioxide and manganese dioxide can be employed by preference.

2. Oxygen Reduction Electrode

The oxygen reduction electrode of the present invention is an oxygen reduction electrode comprising a nanostructured manganese oxide formed from secondary particles that is an aggregation of primary particles, wherein oxygen reduction potential near −0.1 V is exhibited in a cyclic voltammogram obtained by cyclic voltammetry using a three-electrode cell having the nanostructured manganese oxide as the working electrode, platinum as the counter electrode, silver/silver chloride as the reference electrode and an aqueous 0.1 mol/l potassium hydroxide solution at pH 13 as the electrolyte.

In the oxygen reduction electrode of the present invention, a manganese oxide nanostructure comprising secondary particles which are aggregations of primary particles is used at least as the electrode material and particularly as the active electrode material or activator (catalyst material). By converting a manganese oxide to a nanostructure it is possible to achieve an oxygen reduction catalysis ability which is not provided by ordinary bulk materials.

Apart from the use of the aforementioned manganese oxide nanostructure as the electrode material, components of known oxygen reduction electrodes can be employed in the electrode of the present invention. For example, the aforementioned manganese oxide nanostructure formed on a conductive substrate can be used.

For the manganese oxide nanostructure, that obtained by the manufacturing method of 1. above can be used by preference. Consequently, the mean particle size of the primary particles may be no less than 1 nm but no more than 50 nm. Moreover, the mean particle size of the secondary particles may be no less than 100 nm but no more than 1 μm. Moreover, it is desirable to use at least one of manganese monoxide, trimanganese tetroxide, dimanganese trioxide and manganese dioxide as the manganese oxide.

There are no particular limits on the form and size of the manganese oxide nanostructure. For example, the desired oxygen reduction characteristics can be achieved if it is a layer (film) having a thickness of 500 nm or less (preferably no less than 100 nm but no more than 500 nm).

The oxygen reduction electrode of the present invention exhibits oxygen reduction potential around −0.1 V (preferably, no less than −0.2 V and no more than 0 V) in a cyclic voltammogram obtained by cyclic voltammetry using a three-electrode cell having this electrode as the working electrode, platinum as the counter electrode, silver/silver chloride as the reference electrode and an aqueous potassium hydroxide solution of concentration 0.1 mol/L, pH 13 as the electrolyte. That is, with the electrode of the present invention oxidation reduction performance can be obtained at a lower voltage.

More specifically, the aforementioned cyclic voltammetry method can be performed under conditions such as those described in Example 1 below. In particular, a nanostructured manganese oxide having a diameter of 2 mm and a thickness of 100 nm can be formed in the center of the circle of the upper surface of glassy carbon 501 (diameter 3 mm×height 3 mm) as a test electrode, and this can then be used fixed to a copper rod.

Embodiments of the manufacturing method of the present invention are explained in detail below with reference to the figures.

EMBODIMENT 1

In this embodiment, a nanostructure composed of manganese oxide ($MnO_x$) and a preparation method therefor are explained.

Figure 2:
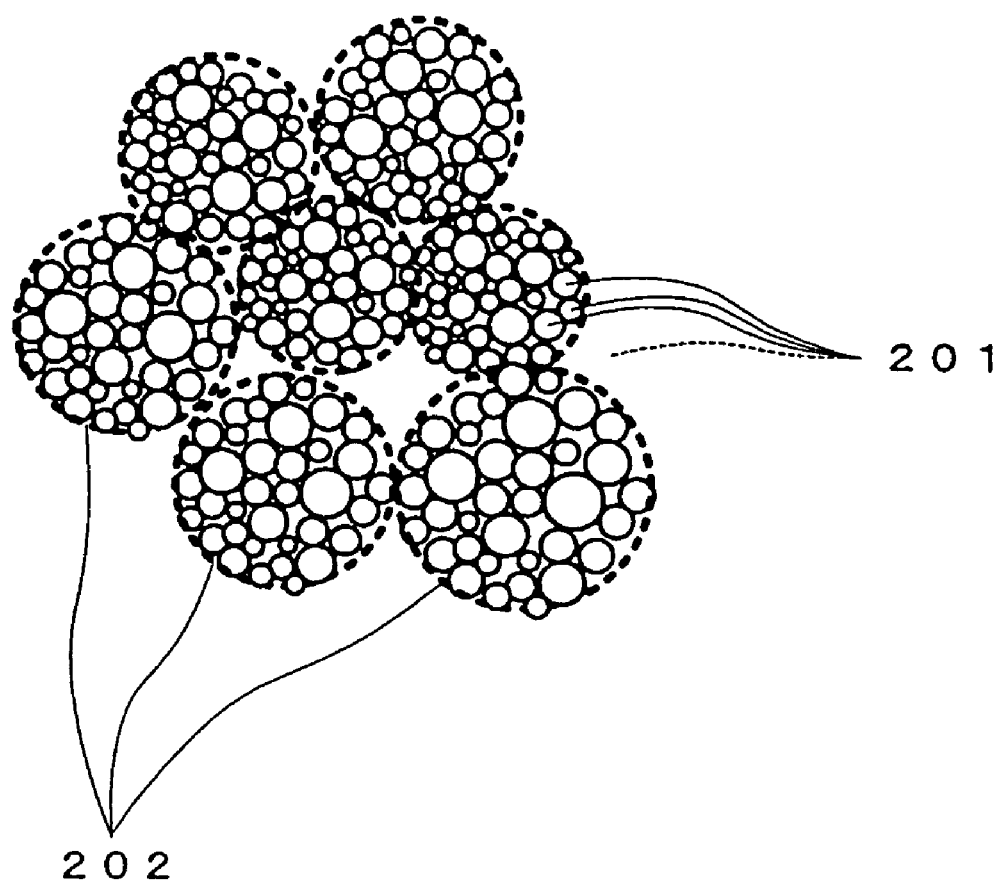
FIG. 2 shows a structural model of a manganese oxide nanostructure according to an embodiment of the present invention having a structure composed of secondary particles which are aggregations of primary particles.

FIG. 1 is an image showing the results of scanning electron microscopic observation of a nanostructured manganese oxide of this embodiment. A model view of the nanostructured manganese oxide is shown in FIG. 2. As shown in FIG. 2, the aforementioned nanostructure has a structure in which secondary particles 202 having a size of a few hundred nanometers are formed by aggregation of primary particles 201 having a size of a few tens of nanometers. An investigation of the nanostructured manganese oxide of FIG. 1 by x-ray absorption fine structure analysis confirmed that it was composed primarily of trimanganese tetraoxide.

The primary constituent substance of the manganese oxide nanostructure may also be manganese monoxide, dimanganese trioxide, manganese dioxide or the like with a different valence.

FIG. 3 shows a nanostructure preparation device used in the method of preparing a nanostructured manganese oxide of the present invention.

A nanostructured manganese oxide of FIG. 1 composed mainly of trimanganese tetroxide can be prepared by laser ablation using a target made of a sintered body of trimanganese tetroxide. The manufacture of this nanostructure composed of trimanganese tetroxide is explained below as an example.

In FIG. 3, reference number 301 indicates a metal reaction chamber in which the target is arranged. The bottom of reaction chamber 301 is equipped with ultra-high vacuum exhaust system 301, which removes the air from reaction chamber 301 to make reaction chamber 301 an ultra-high vacuum. Gas feed line 304, which supplies atmospheric gas to reaction chamber 301, is attached to reaction chamber 301. Mass flow controller 303, which controls the flow of atmospheric gas supplied to reaction chamber 301, is attached to gas feed line 304. The bottom of reaction chamber 301 is also equipped with gas exhaust system 305, which differentially exhausts the atmospheric gas from reaction chamber 301. The gas feed line 304 between reaction chamber 301 and mass flow controller 303 is equipped with a valve. There are also valves between ultra-high vacuum exhaust system 302 and reaction chamber 301 and between gas exhaust system 305 and reaction chamber 301.

Target holder 306, which holds target 307, is arranged within reaction chamber 301. Rotating shaft 306a is attached to this target holder 306. Target 307 is made to rotate (8 rotations/minute) by the rotation of this rotating shaft under the control of a rotational control (not shown). Substrate 309 is arranged facing substantially parallel to the surface of this target 307 (on-axis). Material desorbed or ejected from target 307 as it is excited by irradiation with laser light is deposited on this substrate 309. A poly-crystalline sintered target of trimanganese tetroxide ($Mn_3O_4$, purity 99.9%) is used here as target 307.

Pulse laser light source 308 which directs laser light as an energy beam at target 307 is positioned outside reaction chamber 301. Laser introduction window 310, which introduces the laser light into reaction chamber 301, is attached to the top of reaction chamber 301. Slit 311, lens 312 and reflector 313 are arranged in order of closeness to light source 308 on the path of the laser light emitted by pulse laser light source 308, and after being reshaped by slit 311, focused by lens 312 and reflected by reflector mirror 313, the laser light emitted by pulse laser light source 308 passes through laser introduction window 310 to illuminate target 307, which is arranged inside reaction chamber 301.

The operations in a nanostructure preparation device of the aforementioned composition are explained. The interior of reaction chamber 301 is first emptied to an ultimate vacuum of about $1.0 \times 10^{-6}$ Pa by means of ultra-high vacuum exhaust system 302 having a turbo-molecular pump as the main part, and He gas is then introduced through gas introduction line 304 via mass flow controller 303. By coordinating with the operation of gas exhaust system 305, the main body of which is a scroll pump or helical groove pump, the atmospheric noble gas pressure inside reaction chamber 101 is set to a single value in the range of about 13.33 to 1333 Pa.

In this state, laser light is irradiated from pulse laser light source 308 to the surface of poly-crystalline sintered target 307 of $Mn_3O_4$ with a purity of 99.9%, which is set in target holder 306 which has an autorotation mechanism. An argon fluorine (ArF) excimer laser (wavelength 193 nm, pulse duration 12 ns, pulse energy 50 mJ, energy density 1 J/cm$^2$, repeating frequency 10 Hz) is used here. A laser ablation phenomenon then occurs on the surface of $Mn_3O_4$ target 307 in which ions or neutral particles (atoms, molecules, clusters) of Mn, O, MnO, $Mn_2O_3$ and the like are eliminated, with an initial kinetic energy of 50 eV for the ions and 5 eV for the neutral particles, and are ejected mainly in the target normal direction (that is, the normal direction with respect to the surface of target 307) while maintaining a size on the level of molecules or clusters. The flight direction of this desorbed substance is then randomized by collisions with noble gas atoms (He here) in the atmosphere, the kinetic energy is dissipated in the atmosphere (the He), and nanostructures are deposited on the facing substrate 309 about 35 mm away. The temperature of substrate 309 and the temperature of target 307 are not actively controlled.

He gas is used here as the atmospheric gas, but another inert gas such as Ar, Kr, Xe, $N_2$ or the like can also be used. In this case, the pressure can be set so that the gas density is equivalent to that of He gas. For example, when Ar (gas density 1.78 g/l) is used as the atmospheric gas, the pressure can be set at about 0.1 based on the standard of He (gas density 0.18).

The fine structure and valence of a manganese oxide deposited by the aforementioned methods with a pressure of 667 Pa of He as the atmospheric gas were evaluated. X-ray absorption fine structure analysis was used to evaluate valence, by comparison with a powder material (purity 99.9% or more).

As shown in FIG. 1, it was confirmed that the deposited manganese oxide formed a nanostructure wherein the minimum constituent unit was primary particles of a few tens of nanometers which had aggregated as secondary particles of a few hundred nanometers. A nanostructured manganese oxide such as that shown in FIG. 1 was confirmed by x-ray absorption fine structure analysis to be composed mainly of trimanganese tetroxide.

The above results show that with the method of manufacturing a nanostructured manganese oxide of the present embodiment, even using inert gas containing no oxygen, it is possible by controlling the atmospheric gas pressure to prepare a nanostructure which reflects the target composition. In other words, it is shown that by optimizing the interactions (collision, scattering, confinement effect) between the inert gas and the substance (mainly atoms, ions and clusters) emitted from the target by laser irradiation, it is possible to prepare a nanostructured manganese oxide having a structure composed of secondary particles which are aggregation of primary particles which retain the composition of target 307.

As discussed above, with the method for preparing a manganese oxide nanostructure of the present embodiment, it is possible to prepare a manganese oxide nanostructure having a structure composed of secondary particles which are aggregations of primary particles which retain the manganese valence of target 307 without the need for introduction of oxidizing gas or heating of the substrate.

Moreover, in some cases it is necessary to further adjust the valence of the manganese oxide nanostructure obtained by the aforementioned method. In such cases, it is effective to add a step in which the substrate is heated and maintained at a fixed temperature. As an example, a trimanganese tetroxide nanostructure deposited at a He gas pressure of 667 Pa was subjected to heat treatment in oxygen gas. In x-ray absorption fine structure analysis, it was confirmed that the resulting sample had a higher valence than the material of target 307, being a nanostructure consisting mainly of dimanganese trioxide.

The material of target 307 is not limited to a poly-crystalline sintered body of trimanganese tetroxide, and one with a different valence such as dimanganese trioxide or the like can be used, a single crystal target also can be used.

EMBODIMENT 2

The method for preparing a manganese oxide nanostructure according to the present embodiment is explained in detail below.

In the present embodiment, manganese oxide is deposited on a substrate using laser ablation in a mixed gas atmosphere of noble gas (Ar, He or the like) and oxidizing gas. In this case, the oxidizing gas may be mixed with the noble gas in the range of 0.1 to 50% (mass fluid ratio) of the mixture.

In the present embodiment, as in Embodiment 1, a nano-structured manganese oxide is prepared by laser ablation of a target using the equipment shown in FIG. 3 and using the higher harmonics of a YAG laser or an excimer laser. Reaction chamber 301 is emptied to an ultimate vacuum of $1.0 \times 10^{-6}$ Pa by means of ultra-high vacuum exhaust system 302, the main body of which is a turbo-molecular pump, and a mixed gas of He and $O_2$ (mass flow ratio 9:1) is introduced through gas introduction line 304 via mass flow controller 303. By coordinating with the operation of gas exhaust system 305, the main body of which is a scroll pump or helical groove pump, the atmospheric noble gas pressure inside reaction chamber 301 is set to a single value in the range of about 13.33 to 1333 Pa.

In this state, laser light is directed from pulse laser light source 308 to the surface of poly-crystalline sintered target 307 of dimanganese trioxide ($Mn_2O_3$) with a purity of 99.9%, which is set in target holder 306 which has an autorotation mechanism. An argon fluorine (ArF) excimer laser (wavelength 193 nm, pulse duration 12 ns, pulse energy 50 mJ, energy density 1 J/cm$^2$, repeating frequency 10 Hz) is used here. A laser ablation phenomenon then occurs on the surface of $Mn_2O_3$ target 307 in which ions or neutral particles (atoms, molecules, clusters) of Mn, O, MnO, $Mn_2O_3$ and the like are desorbed, with an initial kinetic energy of 50 eV for the ions and 5 eV for the neutral particles, and are ejected mainly in the target normal direction while maintaining a size on the level of molecules or clusters. The flight direction of this desorbed substance is then randomized by collisions with atmospheric noble gas atoms, the kinetic energy is dissipated in the atmosphere, and it is deposited on the facing substrate 309 about 35 mm away as a thin film or nanostructure. The temperature of substrate 309 and the temperature of target 307 are not actively controlled.

A mixed gas of He and $O_2$ is used here as the atmospheric gas for depositing the manganese oxide, but another noble gas such as Ar, Kr, Xe or the like can be used in place of He gas, and another oxidizing gas such as $O_3$, $N_2O$, $NO_2$ or the like can be used in place of $O_2$. In this case, the pressure can be set so that the mean gas density of the atmospheric gas is equivalent to that of the mixed gas of He and $O_2$.

The fine structure and valence of a manganese oxide deposited by the aforementioned methods with a pressure of 667 Pa of a mixed He/$O_2$ gas as the atmospheric gas were evaluated. X-ray absorption fine structure analysis was used to evaluate valence, by comparison with a powder material (purity 99.9% or more).

Figure 4:
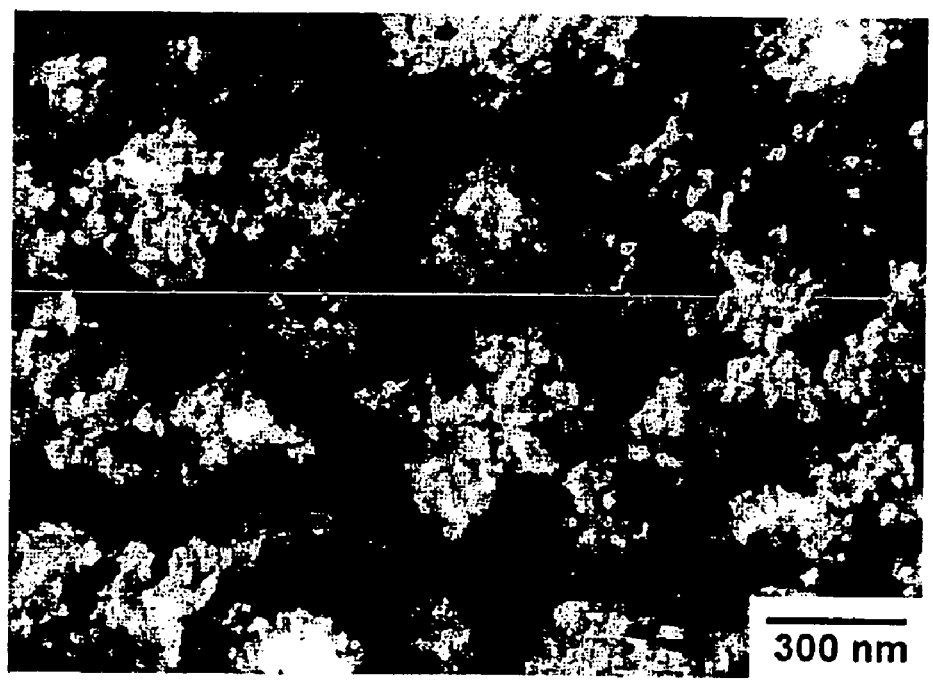
FIG. 4 shows a scanning electron microscope photograph of a manganese oxide nanostructure according to Embodiment 2 of the present invention having a structure composed of secondary particles which are aggregations of primary particles.

As shown in FIG. 4, it was confirmed that the deposited manganese oxide had formed a nanostructure wherein the minimum constituent units were primary particles of a few tens of nanometers which had aggregated as secondary particles of a few hundred nanometers. A manganese oxide nanostructure such as that shown in FIG. 4 was confirmed by x-ray absorption fine structure analysis to be composed mainly of trimanganese tetroxide.

The above results show that in preparing a nanostructured manganese oxide according to the method of the present embodiment for preparing a nanostructure composed of a transitional metal compound, it was possible to increase the valence of the transitional metal (manganese) by controlling the pressure inside the reaction chamber along with the $O_2$ contained in the atmosphere. In other words, it is shown that the substance (mainly atoms, ions, clusters) ejected from target 307 by laser irradiation arrived at the substrate via physical interactions (collisions, scattering, confinement effect) with the inert gas and chemical interactions (oxidation reactions) with the oxygen gas, resulting in the preparation of a nanostructured manganese oxide having a higher valence than the transitional metal valence of the material of target 307. Moreover, the $O_2$ molecules in the atmospheric gas were broken down by the excimer laser into active oxygen atoms or ions, promoting oxidation of the material ejected from the target.

The material of target 307 is not limited to a polycrystalline sintered body of dimanganese trioxide, and one with a different valence such as trimanganese tetroxide or the like may be used, a single crystal target may be used.

EXAMPLES

The characteristics of the present invention are explained in detail below with reference to examples and comparative examples. However, the present invention is not limited by these examples.

Example 1

A test electrode (oxygen reduction electrode) having a nanostructured manganese oxide as the catalyst material was prepared and its oxygen reduction characteristics were investigated.

A manganese oxide nanostructure consisting primarily of secondary particles which were aggregations of primary particles of trimanganese tetroxide, as shown in FIG. 1, was used as the manganese oxide nanostructure. The manufacturing method thereof is explained below.

Figure 5:
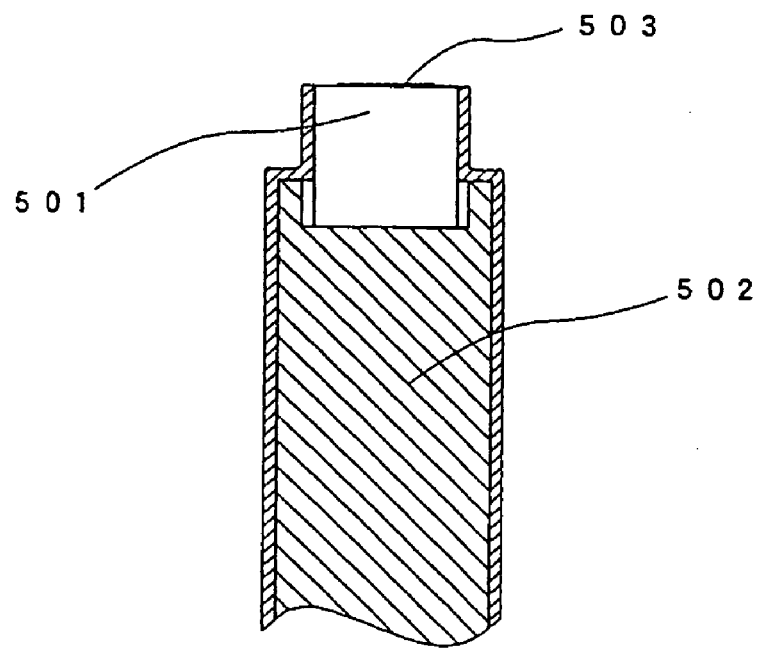
FIG. 5 shows the test electrode of Example 1 of the present invention.
Figure 5:
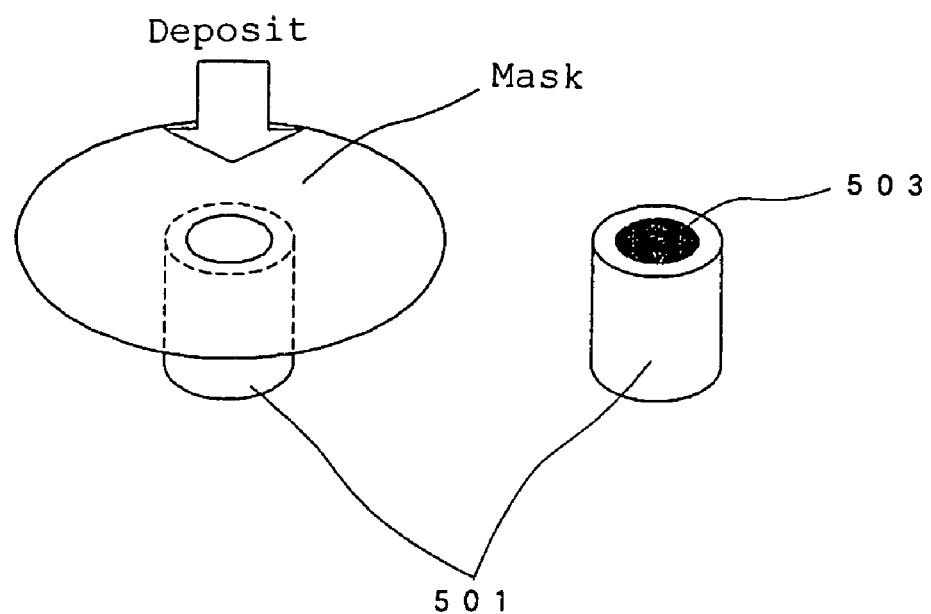

First, using the methods shown in Embodiment 1, a trimanganese tetroxide nanostructure (ref. no. 503) of diameter 2 mm, thickness about 100 nm was directly deposited (supported) via a mask on the center of the upper surface (circle) of glassy carbon 501 of diameter 3 mm, height 3 mm as shown in FIG. 5(*b*). Next, glassy carbon 501 with trimanganese tetroxide structure 503 supported thereon was fixed by means of a water-repellent heat contraction tube on copper rod 502 to obtain the test electrode shown in FIG. 5(*a*).

Figure 9:
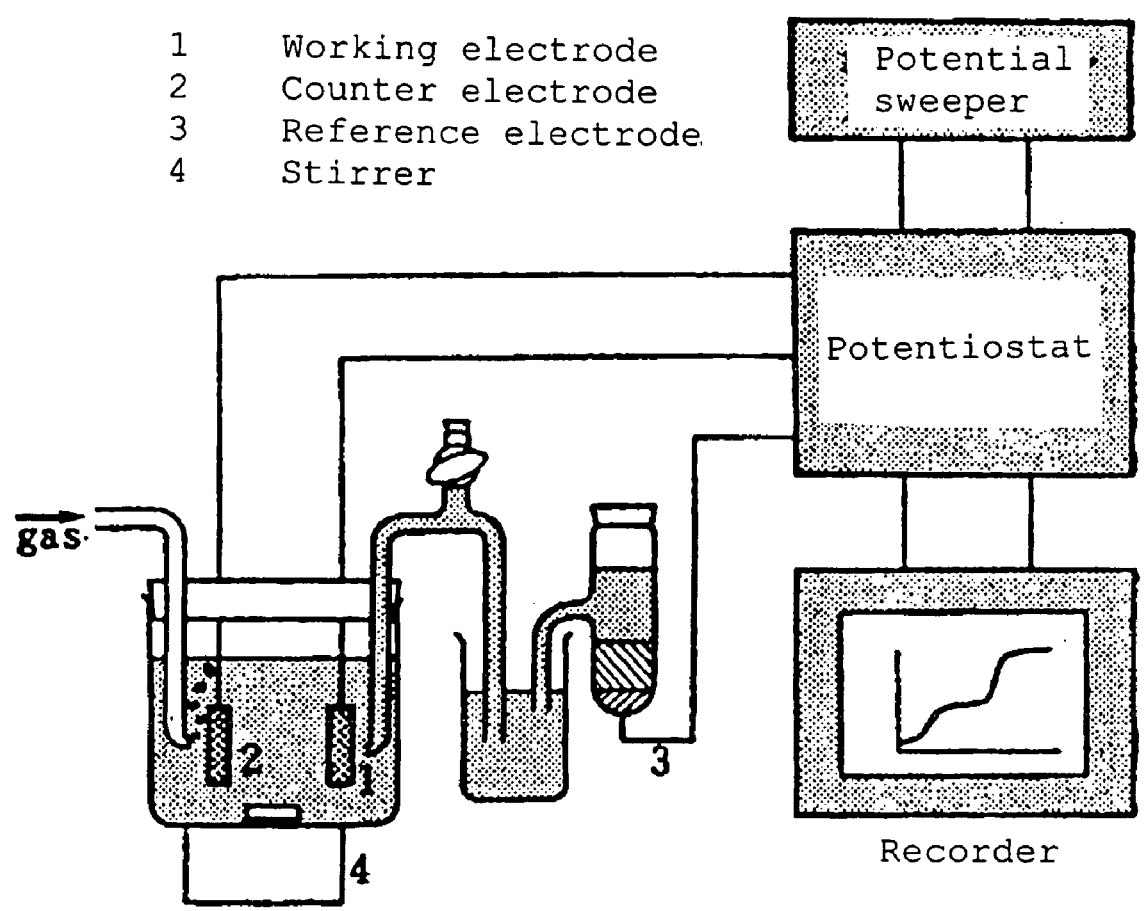
FIG. 9 is a schematic diagram of a cyclic voltammetry measurement device using a three-electrode cell.

Oxygen reduction catalysis was evaluated by cyclic voltammetry in a three-electrode cell using a test electrode prepared by the methods described above. Cyclic voltammetry for the three-electrode cell was performed using a known device such as that shown in FIG. 9.

Using the test electrode as the working electrode, the test was performed in an oxygen atmosphere by dissolving oxygen to saturation in an 0.1 mol/L aqueous potassium hydroxide solution (pH 13). In this case, a platinum wire was used as the counter electrode and a silver/silver chloride electrode as the reference electrode.

Figure 6:
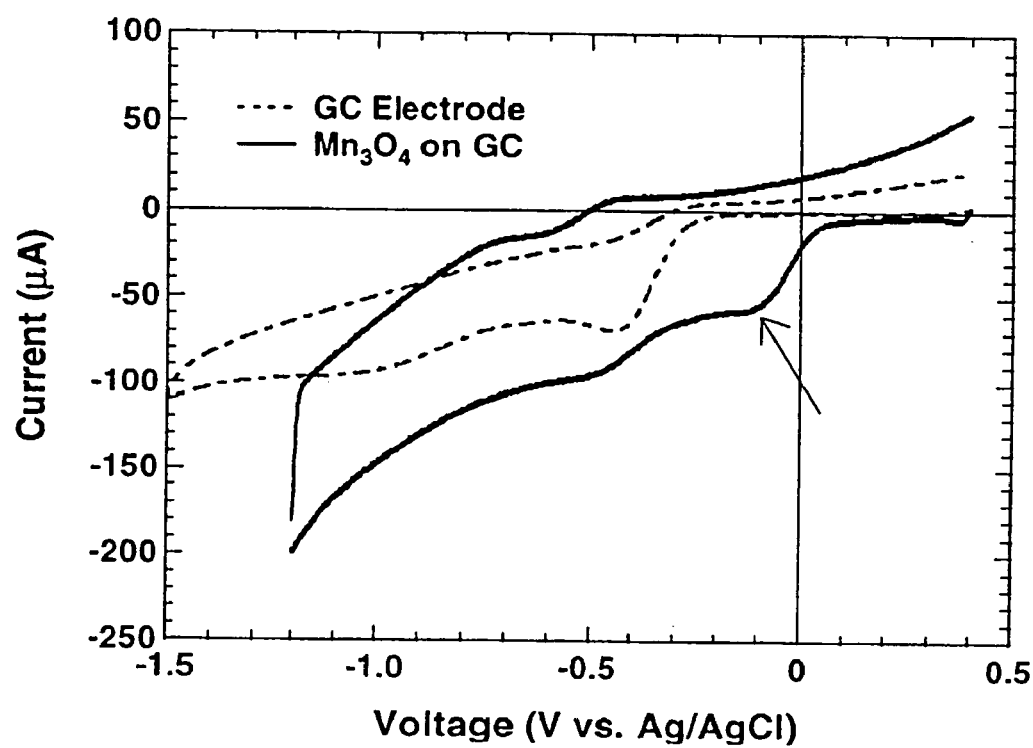
FIG. 6 shows the cyclic voltammogram of Example 1 of the present invention.

The cyclic voltammogram of the aforementioned test electrode is shown by the solid line in FIG. 6. In FIG. 6, the results for a comparative electrode consisting solely of glassy carbon without a supported trimanganese tetroxide nanostructure are shown by the broken line.

Comparing the two, not only did the current increase overall at the same potential in the case of the test electrode having a supported trimanganese tetroxide nanostructure as shown by the solid line, but an oxygen reduction potential peak (arrow in FIG. 6) was observed near −0.1 V which was not seen in the case of the comparative electrode. That is, in comparison with the reduction potential described under "Background Art" oxygen reduction performance in the case of the test electrode occurred at an excess voltage which was about 0.2 V lower.

The above results suggest that because the manganese oxide catalyst is in the form of a trimanganese tetroxide nanostructure having the structure of the present invention composed of secondary particles which are aggregations of primary particles, a new oxygen reduction catalysis ability was achieved even with an extremely thin catalyst layer of about 100 nm.

Example 2

A test electrode (oxygen reduction electrode) having a manganese oxide nanostructure as the catalyst material was prepared and its oxygen reduction characteristics were investigated.

A manganese oxide nanostructure consisting primarily of secondary particles which were aggregations of primary particles of trimanganese tetroxide, as shown in FIG. 1, was used as the manganese oxide nanostructure. The manufacturing method thereof is explained below.

Figure 7:
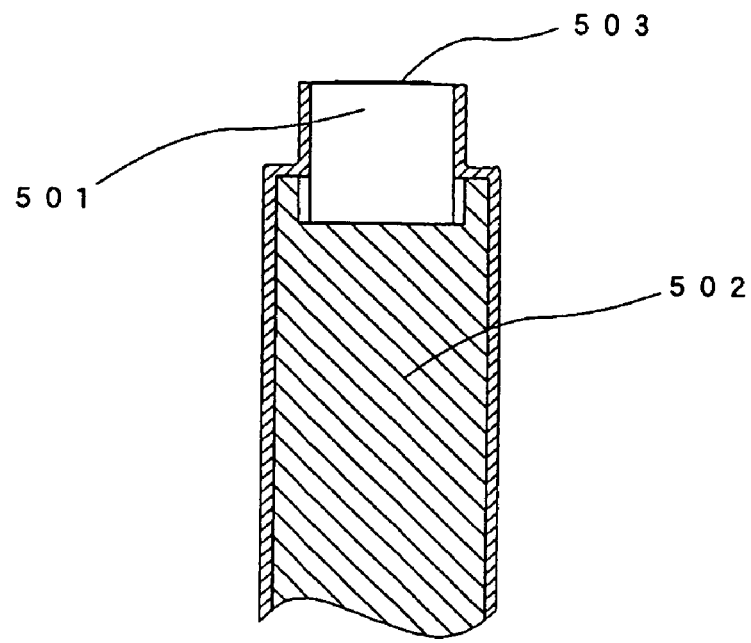
FIG. 7 shows the test electrode of Example 2 of the present invention.
Figure 7:
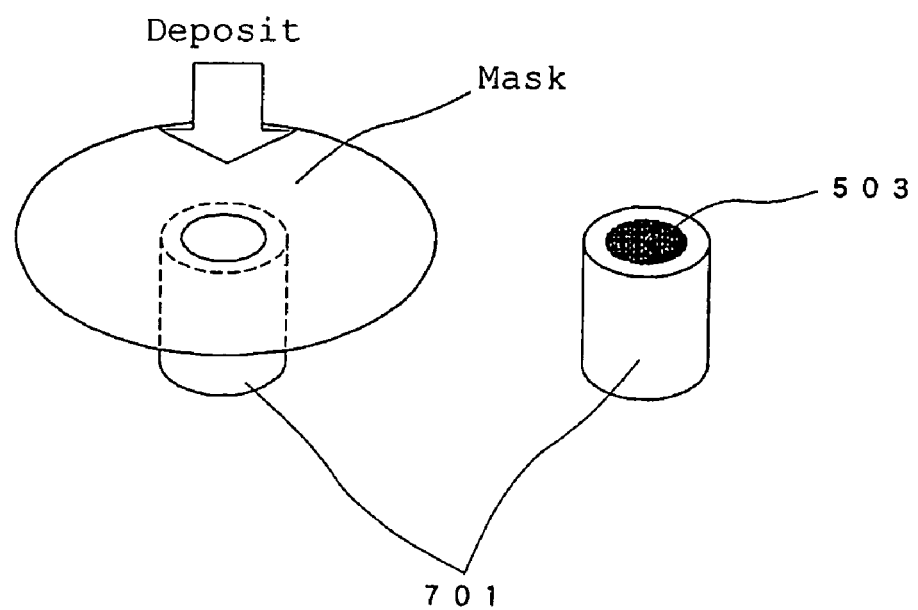

First, using the methods explained in Embodiment 1, a trimanganese tetroxide structure (ref. no. 503) of diameter 2 mm, thickness about 100 nm was directly deposited (supported) via a mask on the center of the upper surface (circle) of gold rod 701 of diameter 3 mm, height 3 mm as shown in FIG. 7(*b*). Next, gold rod 701 with trimanganese tetroxide structure 503 supported thereon was fixed by means of a water-repellent heat contraction tube on copper rod 502 to obtained the test electrode shown in FIG. 7(*a*).

Oxygen reduction catalysis was evaluated by cyclic voltammetry in a three-electrode cell using a test electrode prepared by the methods described above. Cyclic voltammetry for the three-electrode cell was performed using a known device such as that shown in FIG. 9. Using the test electrode as the working electrode, the test was performed in an oxygen atmosphere by dissolving oxygen to saturation in an 0.1 mol/L aqueous potassium hydroxide solution (pH 13). In this case, a platinum wire was used as the counter electrode and a silver/silver chloride electrode as the reference electrode.

Figure 8:
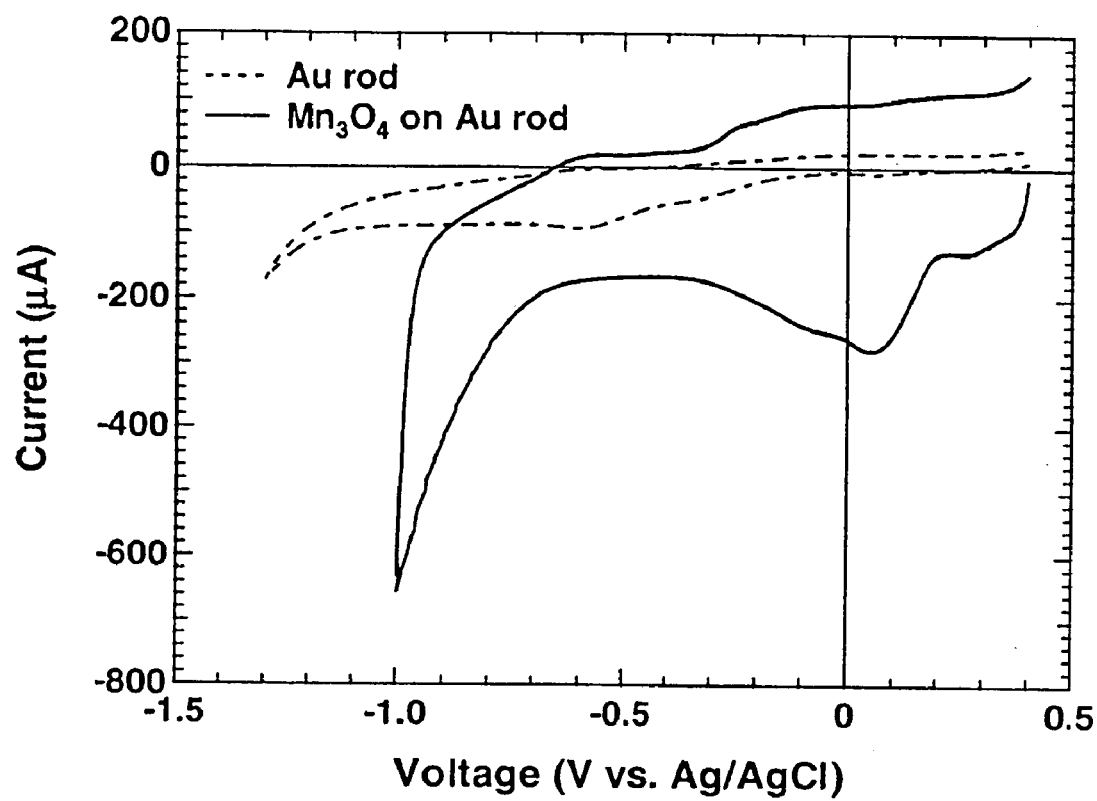
FIG. 8 shows the cyclic voltammogram of Example 2 of present invention.

The cyclic voltammogram of the aforementioned test electrode is shown by the solid line in FIG. 8. In FIG. 8, the results for a comparative electrode consisting solely of a gold rod without a supported trimanganese tetroxide nanostructure are shown by the broken line. Comparing the two, not only did the current increase overall in the case of the test electrode having a supported trimanganese tetroxide nanostructure as shown by the solid line, but oxygen reduction potential was observed aruond +0.1 V and around −0.1 V which was not seen in the case of the comparative electrode. That is, in comparison with the reduction potential described under "Background Art", oxygen reduction in the case of the test electrode occurred at excess voltages which were about 0.4 V and about 0.2 V lower.

The above results suggest that because the manganese oxide catalyst is in the form of a trimanganese tetroxide nanostructure having the structure of the present invention composed of secondary particles which are aggregations of primary particles, a new oxygen reduction catalysis ability was achieved even with an extremely thin catalyst layer of about 100 nm.

Comparative Example 1

A test electrode was prepared as in Example 1 except that in the step (Embodiment 1) of depositing the trimanganese tetroxide nanostructure on the substrate, the target plate and substrate were arranged substantially perpendicular to one another (off-axis). In a cyclic voltammogram obtained for the resulting test electrode as in Example 1, oxygen reduction potential was observed near 0.4 V.

INDUSTRIAL APPLICABILITY

The nanostructured manganese oxide of the present invention has superior oxygen reduction catalysis activity and is useful as a catalyst material for use in the oxygen electrodes of air zinc cells, fuel cells and the like. Moreover, it is also applicable to uses such as cheap reduction catalysts and the like to replace expensive platinum catalyst materials, allowing costs to be greatly reduced.

ADVANTAGES OF THE INVENTION

In the manufacturing method of the present invention, because manganese oxide is prepared by so-called on-axis laser ablation, it is possible to manufacture a manganese oxide nanostructure with a specific structure composed of secondary particles which are aggregations of primary particles.

Moreover, in the manufacturing method of the present invention, it is possible to control the valence of the manganese in the manganese oxide and the nanometer-sized fine structure by optimizing the interactions (collision, scattering, confinement effect) between the atmospheric gas and the substance (mainly atoms, ions, clusters) ejected from the target by irradiation with laser light.

Accordinf to the electrode of the present invention, oxygen reduction properties (catalytic activity) can be obtained through the use of a nanostrucrured manganese oxide having the aforementioned specific structure as the electrode material (catalyst material).

The invention claimed is:

1. A method for manufacturing a nanostructured manganese oxide which has oxygen reduction catalysis ability and is formed from secondary particles that is an agglomeration of primary particles, wherein the method comprises the steps of;
   removing components from a target plate that comprises one or more kinds of manganese oxides by irradiating the target plate with laser light, and
   depositing the removed components on a substrate that is opposed to the target plate substantially in parallel to obtain the nanostructured manganese oxide.

2. The method of claim 1, wherein the oxygen reduction potential of the nanostructured manganese oxide is in the vicinity of −0.1 V in a cyclic voltammogram employing a cyclic voltammetry, the cyclic voltammetry using a three-electrode cell in which the nanostructured manganese oxide is used as the working electrode, platinum is used as the counter electrode, silver/silver chloride is used as the reference electrode, and an aqueous 0.1mol/l potassium hydroxide solution at pH 13 is usedas the electrolyte.

3. The manufacturing method according to claim 1, wherein the steps are carried out in an atmosphere comprising inert gas.

4. The manufacturing method according to claim 3, wherein energy is provided to activate the atmosphere.

5. The manufacturing method according to claim 3, wherein the pressure of the gas is in the range of no less than 13.33 Pa and no more than 1333 Pa.

6. The manufacturing method according to claim 3, wherein the pressure of the atmosphere is altered.

7. The manufacturing method according to claim 1, wherein the steps are carried out in an atmosphere comprising a mixed gas of inert gas and reactive gas.

8. The manufacturing method according to claim 7, wherein the content of the reactive gas is no less than 0.1% and no more than 50% in terms of the mass flow ratio.

9. The manufacturing method according to claim 7, wherein the reactive gas is an oxidizing gas.

10. The manufacturing method according to claim 9, wherein the oxidizing gas is a gas containing oxygen gas.

11. The manufacturing method according to claim 7, wherein energy is provided to activate the atmosphere.

12. The manufacturing method according to claim 7, wherein the pressure of the gas is in the range of no less than 13.33 Pa and no more than 1333 Pa.

13. The manufacturing method according to claim 7, wherein the pressure of the atmosphere is altered.

14. The manufacturing method according to claim 1, wherein the laser light is pulse laser light with a pulse duration of no less than 5 ns and no more than 20 ns.

15. The manufacturing method according to claim 1, wherein the laser light is from an excimer laser having halogen gas and noble gas as the laser medium.

16. The manufacturing method according to claim 1, wherein the energy density of the laser light is no less than 0.5 J/cm$^2$ and no more than 2 J/cm$^2$.

17. The manufacturing method according to claim 1, wherein the target plate absorbs light having the wavelength range of the laser light.

18. The manufacturing method according to claim 1, wherein the target plate is a sintered body of manganese oxide.

19. The manufacturing method according to claim 1, further comprising a step of heating the obtained nanostructured manganese oxide.

20. The manufacturing method according to claim 1, further comprising a step of installing the target plate and the substrate in the reaction system so as to be facing and parallel to each other in advance before the steps.

21. The manufacturing method according to claim 1, further comprising a step of adjusting at least one of 1) the pressure of the atmosphere and 2) the distance between the target plate and the substrate, in order to control the size of the high-temperature and the high-pressure region that is formed in the vicinity of the target plate by irradiating the target plate with the laser light.

* * * * *

UNITED STATES PATENT AND TRADEMARK OFFICE
CERTIFICATE OF CORRECTION

PATENT NO.         : 7,338,582 B2                                         Page 1 of 1
APPLICATION NO.    : 11/203994
DATED              : March 4, 2008
INVENTOR(S)        : Mobuyasu Suzuki et al.

It is certified that error appears in the above-identified patent and that said Letters Patent is hereby corrected as shown below:

In Column 15, Line 51 (Claim 2), change "usedas" to --used as--.

Signed and Sealed this

Seventeenth Day of February, 2009

JOHN DOLL
*Acting Director of the United States Patent and Trademark Office*